United States Patent
Daub

(10) Patent No.: US 9,660,522 B2
(45) Date of Patent: May 23, 2017

(54) DC-DC CONVERTER CIRCUIT ARRANGEMENT

(71) Applicant: Hella KGaA Hueck & Co., Lippstadt (DE)

(72) Inventor: Wolfgang Daub, Anröchte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 14/413,650

(22) PCT Filed: Jun. 29, 2013

(86) PCT No.: PCT/EP2013/063753
§ 371 (c)(1),
(2) Date: Jan. 8, 2015

(87) PCT Pub. No.: WO2014/009184
PCT Pub. Date: Jan. 16, 2014

(65) Prior Publication Data
US 2015/0137787 A1    May 21, 2015

(30) Foreign Application Priority Data

Jul. 12, 2012 (DE) .......................... 10 2012 106 261

(51) Int. Cl.
*H02M 3/04* (2006.01)
*H02M 3/158* (2006.01)
*H05B 33/08* (2006.01)

(52) U.S. Cl.
CPC ........... *H02M 3/04* (2013.01); *H02M 3/1584* (2013.01); *H05B 33/0815* (2013.01); *H02M 2003/1586* (2013.01); *Y02B 20/346* (2013.01)

(58) Field of Classification Search
CPC ............. H05B 33/0815; Y02B 20/346; H02M 2001/008; H02M 1/045; H02M 1/084;
(Continued)

(56) References Cited

U.S. PATENT DOCUMENTS

| 6,437,462 | B1 | 8/2002 | Maple et al. |
| 2005/0185430 | A1* | 8/2005 | Vinciarelli ............ H02M 3/157 363/65 |

(Continued)

FOREIGN PATENT DOCUMENTS

| DE | 60112789 T2 | 3/2006 |
| DE | 69635520 T2 | 8/2006 |

(Continued)

OTHER PUBLICATIONS

"Fuel cell high-power applications", by Thounthong P et al.

*Primary Examiner* — Gustavo Rosario Benitez
(74) *Attorney, Agent, or Firm* — Husch Blackwell LLP

(57) ABSTRACT

A DC-DC converter circuit arrangement consisting of at least one multiphase DC-DC converter for transporting energy between two electrical systems. The arrangement may include several converter circuits whereby each features at least one first control element that can be regulated. A controller can produce several drive signals that have different phases. One switched mode operation of a converter circuit of the multiphase DC-DC converter can be controlled with each drive signal. The switched mode operation of each converter circuit of each subsequent multiphase DC-DC converter can be controlled by means of a drive signal, which can be produced by the controller. The controller is designed and equipped in such a way that it can enable or disable the energy transport by means of one of the multiphase DC-DC converter.

4 Claims, 1 Drawing Sheet

(58) Field of Classification Search
CPC .............. H02M 1/088; H02M 3/285; H02M 2001/007; H02M 2001/0074; H02M 2001/0077; H02M 3/1584; H02M 3/04; H02M 2003/1586
See application file for complete search history.

(56) References Cited

U.S. PATENT DOCUMENTS

| | | | |
|---|---|---|---|
| 2006/0103359 A1 | 5/2006 | Watanabe et al. | |
| 2006/0255777 A1* | 11/2006 | Koertzen | H02M 1/088 323/272 |
| 2006/0285370 A1* | 12/2006 | Lee | H02M 3/33507 363/25 |
| 2010/0314937 A1* | 12/2010 | Jacobson | H02M 3/28 307/18 |
| 2012/0175962 A1* | 7/2012 | Zhan | H02J 1/102 307/82 |
| 2012/0181873 A1* | 7/2012 | Butzmann | H01M 10/425 307/82 |
| 2013/0134935 A1 | 5/2013 | Maitra et al. | |
| 2013/0193755 A1* | 8/2013 | Chang | H02J 1/10 307/18 |
| 2014/0233137 A1* | 8/2014 | Daub | H02H 7/268 361/18 |

FOREIGN PATENT DOCUMENTS

| | | |
|---|---|---|
| DE | 112005000289 T5 | 2/2007 |
| EP | 2615731 A1 | 7/2013 |

* cited by examiner

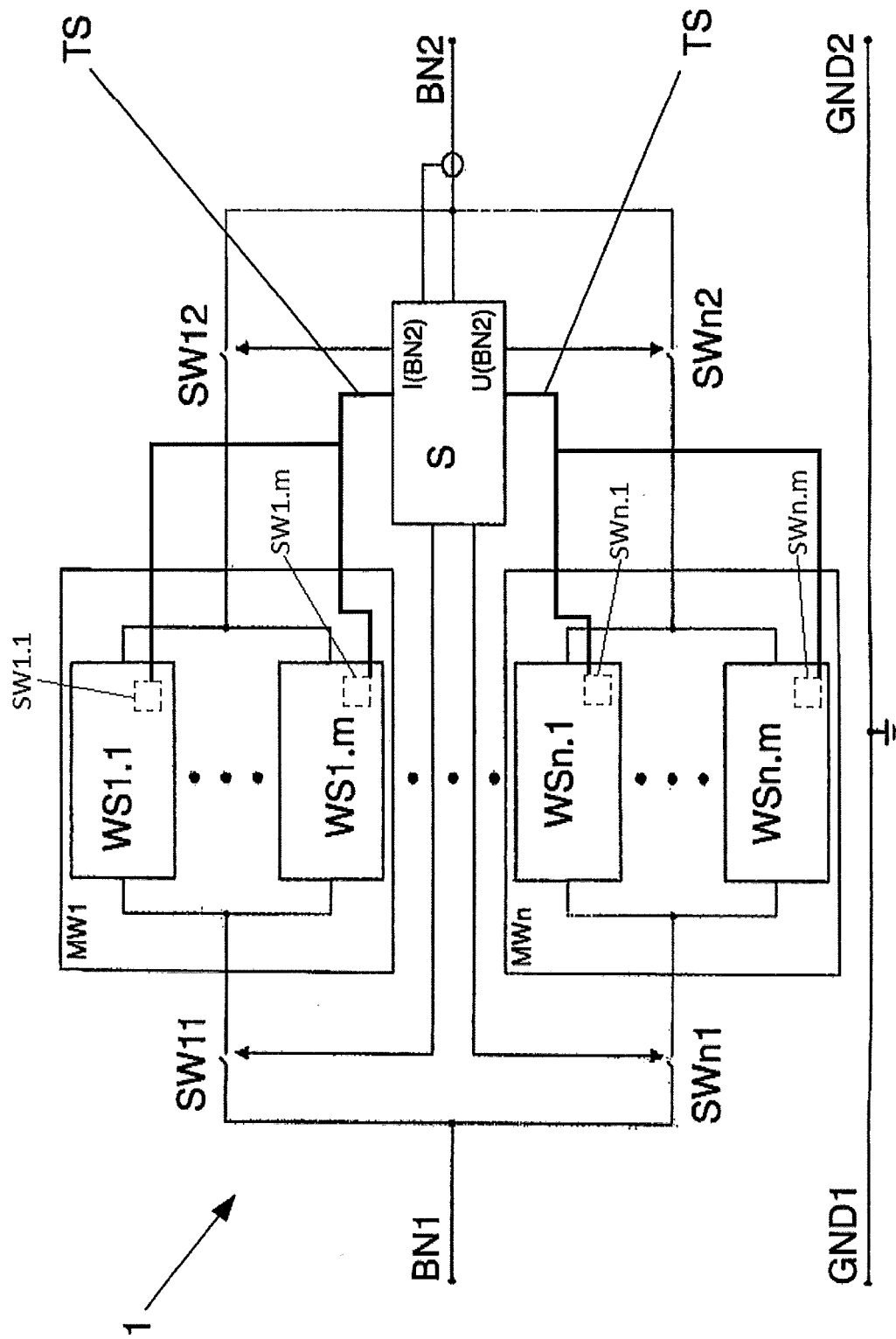

DC-DC CONVERTER CIRCUIT ARRANGEMENT

CROSS REFERENCE

This application claims priority to PCT/EP2013/063753, filed Jun. 29, 2013, which itself claims priority to German Application No. 10 2012 106261.7, filed Jul. 12, 2012, which are both hereby incorporated by reference.

FIELD OF TECHNOLOGY

The invention relates to a DC-DC converter circuit arrangement with a multiphase DC-DC converter comprising of several converter circuits, wherein each converter circuit consists of at least one control element that can be regulated, and with a controller that produces several drive signals, whereby the drive signals have different phases and a switched mode operation of a converter circuit can be controlled by means of each drive signal.

BACKGROUND

From the prior art, DC-DC converters with a converter circuit and a controller are known, where the controller produces a drive signal for operating the switched mode operation of the converter circuit. By means of the controller, it is possible to adapt the converter circuit to the operating conditions of the DC-DC converter, in particular to the load of the DC-DC converter. A disadvantage of such a DC-DC converters is that the converter circuit has a low efficiency when there is little load to the DC-DC converter circuit.

A multiphase DC-DC converter is known from the document DE 11 2008 004 030 T5. This DC-DC converter consists of a number of converter circuits that are switched parallel to each other. The amount of converter circuits that are in operation can be changed, whereby each one of the operating converter circuits performs one switching mode operation. The DC-DC converter consists of a controller that produces a number of drive signals for the converter circuits which have different phases, in order to drive the control elements of the respective converter circuits, by means of which the switch mode operation processes can be controlled. Each converter circuit is permanently assigned to one phase. Depending on the operating conditions of the DC-DC converter, the controller determines the amount of converter circuits that are to be operated. Thus, based on the operating conditions, converter circuits of the DC-DC converter are switched off, which means that no drive signals are produced which have the phase that is assigned to these converter circuits.

The multiphase DC-DC converter that is known from the document DE 11 2008 004 030 T5 can be adapted to the load of the DC-DC converter. This is advantageous, since it is possible to operate the converter circuit of the multiphase DC-DC converter with different loads to the multiphase DC-DC converter in such a way, that it can be operated with a good efficiency. Yet, a disadvantage of the multiphase DC-DC converter is that the electromagnetic noise emission increases as soon as one or more phases are inactive, which means when not all converter circuits are operated. Input and output filters must be elaborately designed for the frequencies of a phase and at times also for sub-harmonic noise.

A multiphase DC-DC converter is also known from the document DE 10 2009 054 957 A1. This DC-DC converter consists of a number of converter circuits that are switched parallel to each other. The amount of converter circuits that are to be operated can be changed. The DC-DC converter consists of a controller that produces a number of drive signals for the converter circuits which consist of different phases in relation to each other, in order to drive the control elements of the respective converter circuits, by means of which the switch mode operation processes can be controlled. Depending on an operating condition of the DC-DC converter, the controller determines the amount of converter circuits that have to be operated, and determines the phase difference between the drive signals, if the controller determines that the number of converter units, that have to be operated should be two or more. By means of this multiphase DC-DC converter, power can be transmitted within a wide range with high efficiency. Yet, when there is less load, the amount of phases is reduced, which leads to an increase in ripples.

SUMMARY OF THE INVENTION

It is the objective of the invention to find an alternative solution for a multiphase DC-DC converter, which can adapt to different load demands and which is furthermore designed and equipped to connect to more than two electrical systems.

This objective is accomplished in that
the DC-DC converter circuit arrangement consists of at least one further multiphase DC-DC converter for transporting energy between two electrical systems, comprising of several converter circuits, whereby each converter circuit features at least one first control element that can be regulated,
that the switched mode operation of each converter circuit of each subsequent multiphase DC-DC converter can be controlled by means of a drive signal, which can be produced by the controller, and
that the controller is designed and equipped in such a way that it can enable or disable the energy transport by means of one of the multiphase DC-DC converter.

In line with the invention, it is possible to arrange at least one second control element in series to each multiphase DC-DC converter of the DC-DC converter circuit arrangement, whereby the second control elements can be operated to close or to open by means of the controller in order to enable or disable the energy transport. When the second control elements in series to a multiphase DC-DC converter are switched to close, it is possible to transfer energy by means of this multiphase DC-DC converter, if the at least one first control element(s) of the converter circuit of this multiphase DC-DC converter are correspondingly triggered by the controller by means of drive signals. But when the second control elements in series to this multiphase DC-DC converter are switched to open, an energy transport by means of this multiphase DC-DC converter is blocked, even if the first control elements of the converter circuit of this multiphase DC-DC converter are set into switched mode operation by means of drive signals of the controller.

A DC-DC converter circuit arrangement according to the invention can consist of a first connection for connecting to a first electrical system and a second connection for connecting to a second electrical system. The series connection of the multiphase DC-DC converters and of the two control elements can then be switched parallel between the first connection and the second connection. In this embodiment of the invention, energy can be transmitted between the first and the second electrical system. In order to accomplish this in dependence of the load that is to be transmitted, one or several or all of the multiphase DC-DC converters can be used. If there is a need to transmit only little load, e.g. only the second control elements can be switched in series to one multiphase DC-DC converter, in order to enable the energy transport by means of this multiphase DC-DC converter, whereas for a transmission of high load the second control elements in series to the multiphase DC-DC converters are all switched to close.

Another DC-DC converter circuit arrangement according to the invention can consist of a first connection for connecting to a first electrical system, a second connection for connecting to a second electrical system and a third connection for connecting to a third electrical system. At least two series connections of the multiphase DC-DC converters and the second control elements can be switched parallel between the first connection and the second connection and between the second connection and the third connection. In this DC-DC converter circuit arrangement, an energy transport is possible between the first and the second electrical system and between the second and the third electrical system.

Generally, it is possible to describe a DC-DC converter circuit arrangement according to the invention in such a way, that the DC-DC converter circuit arrangement consists of n connections and that each connection is connected to an electrical system and to all other connections or to some of the other connections by means of at least two series connections made up of one of the multiphase DC-DC converters and at least one of the two control elements that are connected to each other in parallel.

The converter circuits of a DC-DC converter circuit arrangement according to the invention can have a common ground.

The multiphase DC-DC converters of a DC-DC converter circuit arrangement according to the invention can consist of inductors, by means of which the converter circuits of the multiphase DC-DC converters are coupled to each other. In order to accomplish this, the inductors of a multiphase DC-DC converter can be arranged on a common core.

BRIEF DESCRIPTION OF THE DRAWINGS

Reference is now made more particularly to the drawings, which illustrate the best presently known mode of carrying out the invention and wherein similar reference charac-ters indicate the same parts throughout the views.

FIG. 1 is a simplified circuit diagram of a DC-DC converter circuit arrangement according to the invention.

DETAILED DESCRIPTION OF THE DRAWINGS

The DC-DC converter circuit arrangement 1 that is depicted in FIG. 1, connects a first vehicle electrical system with a second vehicle electrical system. A first connection BN 1 and a ground connection GND 1 or a second connection BN 2 and a ground connection GND 2 are intended to accomplish this. The two ground connections GND 1 and GND 2 are arranged on the same potential and are connected to each other.

A parallel circuit of n series connections is intended between the first connection BN1 and the second connection BN2. The series connections are made up of two second control elements SW11, SW12, SWn1, SWn2 and one multiphase DC-DC converter MW1, MWn. The multiphase DC-DC converters MW1, MWn of one series connection are arranged between the two second control elements SW11, SW12, SW11, SWn2 of the series connection. By means of opening or closing the two second control elements in one series connection, an electric current through the multiphase DC-DC converter of the series connection can be enabled or disabled. Thus, an energy transport by means of the multiphase DC-DC converter of the series connection can be enabled or disabled.

Each one of the multiphase DC-DC converters MW1, MWn consists of m converter circuits WS1.1, WS1.m, WSn.1, WSn.m.

The DC-DC converter circuit arrangement 1 further consists of a controller S, which operates the multiphase DC-DC converters MW1, MWn including their converter circuits WS1.1, WS1.m, WSn.1, WSn.m as well as the second control elements SW11, SW12, SWn1, SWn2 that are arranged in series to the multiphase DC-DC converters MW1, MWn.

In order to operate the multiphase DC-DC converters MW1, MWn or their converter circuits WS1.1, WS1.m, WSn.1, WSn.m, the controller produces drive signals TS, which trigger the first control elements SW1.1, SW1.m, SWn.1, SWn.m of the converter circuits WS1.1, WS1.m, WSn.1, WSn.m in the known manner.

The controller is connected to a sensor element in order to measure the current via the second connection BN2. For this purpose, the controller consists of a connection I(BN2). Via a further connection U(BN2), the controller is supplied with the potential at the second connection BN2.

List of the Reference Signs
1 DC-DC converter circuit arrangement
MW1 Multiphase DC-DC converter 1
MWn Multiphase DC-DC converter n
WS1.1 Converter circuit 1 of the multiphase DC-DC converter 1
WS1.m Converter circuit of the multiphase DC-DC converter 1
WSn.1 Converter circuit of the multiphase DC-DC converter n
WSn.m Converter circuit of the multiphase DC-DC converter n
SW11 Second control element that can be regulated
SW12 Second control element that can be regulated
SWn1 Second control element that can be regulated
SWn2 Second control element that can be regulated
S Controller
BN1 Connection to vehicle electrical system 1
BN2 Connection to vehicle electrical system 2
TS Drive signals
I(BN2) Connection of the controller to measure the current in the second electrical system
U(BN2) Connection of the controller to measure the voltage in the second electrical system

The invention claimed is:
1. A DC-DC converter circuit arrangement comprising:
a first multiphase DC-DC converter for transporting energy between two electrical systems, said first multiphase DC-DC converter including at least two converter circuits, whereby each converter circuit features at least one first control element that can be regulated, and
a controller that is capable of producing at least two drive signals, whereby the drive signals have different phases and operation of one of the at least two converter circuits of the first multiphase DC-DC converter can be controlled with each drive signal,
at least a second multiphase DC-DC converter for transporting energy between two electrical systems, said second multiphase DC-DC converter including at least two converter circuits, whereby each converter circuit features at least one first control element that can be regulated, wherein the switched mode operation of each converter circuit of said at least one of said second multiphase DC-DC converter can be controlled by means of at least one of said drive signals, which can be produced by the controller, wherein the controller enables or disables the energy transport by means of the multiphase DC-DC converters; and wherein at least one second control element is arranged in series between to each multiphase DC-DC converter and both of the electrical systems, whereby the second control elements can be operated to close or to open by means of the controller in order to enable or disable the energy transport.

2. The DC-DC converter circuit arrangement according to claim 1, wherein the DC-DC converter circuit arrangement consists of a first connection for connecting to a first electrical system and a second connection for connecting to a second electrical system and that the series connections of each of the multiphase DC-DC converters and of the second control elements are switched parallel between the first connection and the second connection.

3. The DC-DC converter circuit arrangement according to claim 1 wherein the DC-DC converter circuit arrangement consists of n connections and that each connection is connected to all other connections or to some of the other connections by means of at least two series connections made up of one of the multiphase DC-DC converters and at least one of the second control elements, wherein said DC-DC converters are connected to each other in parallel across respective second control elements.

4. The DC-DC converter circuit arrangement according to claim 1 wherein the converter circuits have a common ground.

* * * * *